May 26, 1942. T. W. BRIEGEL 2,284,365
FITTING
Filed Sept. 16, 1940
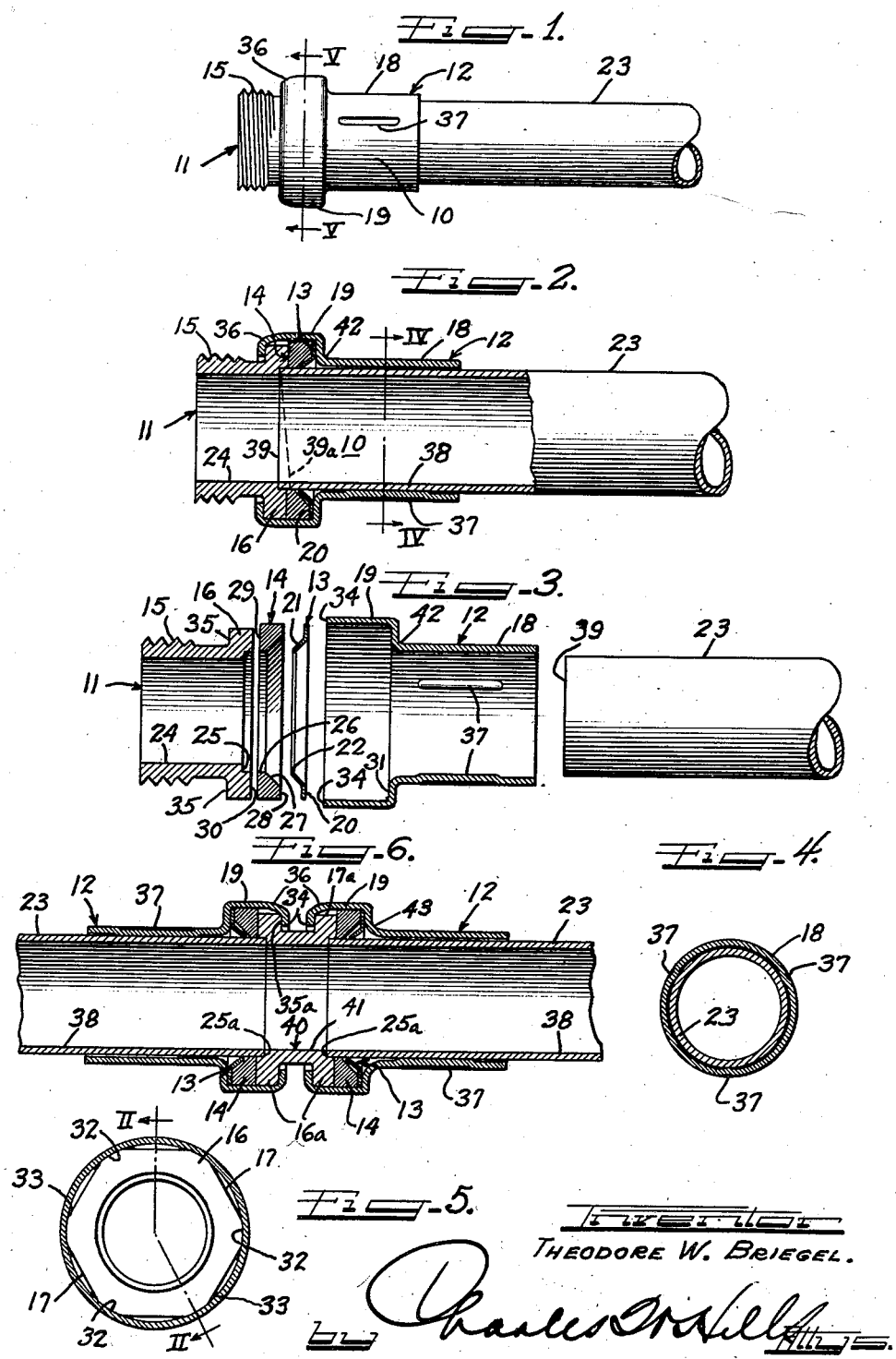
Inventor
THEODORE W. BRIEGEL.

Patented May 26, 1942

2,284,365

UNITED STATES PATENT OFFICE 2,284,365

FITTING

Theodore W. Briegel, Galva, Ill.

Application September 16, 1940, Serial No. 356,953

3 Claims. (Cl. 285—161)

This invention relates to a coupling fitting and to a method of making and assembling the same on tubes, pipes and like conduits. More particularly, the invention relates to a fitting comprising several drawn sheet metal members including a spring lock washer and to a method for assembling the members of the fitting to each other and to tubular conduits by pressing the latter within the fitting.

It has heretofore been customary in connecting thin walled electrical conduits to each other or to an apertured member, such as an outlet box, to provide threaded or flanged compression types of connecting fittings therebetween. These types of fittings are not only expensive but there often results an unwieldy joint of unbalanced appearance when they are connected to thin walled tubings.

It is, therefore, an object of this invention to eliminate these objections by providing a connecting fitting of simple and inexpensive construction which can be assembled by the manufacturer and the fitting applied to lengths of conduits which have been cut on the job.

Another object of the present invention is to provide a drawn sheet metal fitting including a resilient lock washer which fitting is applied to a tubing by a press-fit force of only approximately a third of the force required for pulling the tubing out of the fitting.

It is a further object of this invention to provide a flanged sheet metal fitting of the lock washer type for mounting on a smooth unflanged end of thin walled tubing or for coupling together the ends of conduits.

Still another object of this invention is the provision of a connecting fitting which includes means for mounting the locking portion thereof sufficiently spaced from the end of the inserted tubing to compensate for any angularity in the cutting of the end of the tubing as by a saw on the job.

Another important object of this invention is to provide a sheet metal fitting which is easily and quickly mounted on a smooth end of thin walled tubing or for coupling together the ends of conduits and which provides a positive connection therewith even though the outside diameter of the tubing or conduit may vary due to a wide range in the manufacturers' tolerance.

A still further object of this invention is to provide a sheet metal fitting adapted for mounting on the smooth end of thin walled tubings and which provides a water tight joint.

Another important object of this invention is to provide a simple method of connecting together the unflanged ends of thin walled tubing and light conduits to each other and to other members.

The novel features believed to be characteristic of the present invention are set forth with particularity in the appended claims. The invention itself, however, both as to its organization and manner of construction, with further objects and advantages thereof, may best be understood by reference to the following description taken in connection with the accompanying drawing, in which:

Figure 1 is a plan view of a flanged connecting fitting embodying the principles of this invention and illustrating the fitting as assembled on a conduit end;

Figure 2 is an enlarged view, similar to Figure 1, partly broken away and in longitudinal cross section when taken substantially along a plane as indicated by the line II—II of Figure 5, showing the relationship of parts when the lock washer type of fitting is connected to the smooth end of a tubing or conduit;

Figure 3 is an exploded view of the parts illustrated in the assembled view of Figure 2;

Figure 4 is a transverse cross-sectional view of the connection between the tubular portion of the fitting and the conduit, taken substantially along the plane indicated by the line IV—IV of Figure 2;

Figure 5 is a transverse cross-sectional view, with the flanged portion of the nipple in elevation, taken substantially along the plane indicated by the line V—V of Figure 1 and illustrating the peripheral engagement between the enlarged end of the tubular fitting and the faced flange of the nipple; and Figure 6 is a longitudinal cross-sectional view of a modified form of the device embodying the principles of this invention and illustrating a double coupling arrangement for connecting together the smooth ends of thin walled tubings and like conduits.

The reference numeral 10 indicates generally one form of fitting embodying the principles of this invention and which is formed of the elements illustrated in Figures 2 and 3. The fitting consists of an exteriorly threaded flanged nipple 11, a tubular sheet metal member 12, a resilient lock washer 13, and a spacing washer 14.

The nipple 11 is drawn from sheet metal, die formed from a tubular blank or machined, to the contour as best illustrated in Figure 2. This nipple is provided at one end with exterior threads 15 and at its other end in an outwardly extending peripheral flange 16 having flat faces 17 which form a generally polygonal shape for a purpose to be more fully explained hereinafter. While flat faces forming a hexagonal shape as shown in Figure 5 have been provided, it is to be understood that a single flat face or a plurality of such faces can be used equally as well. The threads 15 are provided for engaging the internal threads of an apertured member (not shown), such as an outlet box, to which a conduit is to be connected.

The drawn sheet metal member 12 of the fitting provides a tubular portion 18 terminating at one end in an enlarged tubular portion 19 having an inside diameter slightly less than the outside over-all diameter of the flange 16 of the nipple 11.

The lock washer 13 is preferably formed of flat spring steel or other resilient material and has an outside diameter at its flat peripheral portion 20 slightly smaller than the inside diameter of the enlarged end 19 of the tubular member 12 for free insertion thereinto. The central portion of the lock washer is angularly offset relative to the plane of its peripheral portion 20 to form a locking portion 21 which is provided with a central aperture 22 for a purpose to be shortly explained.

The nipple 11 has, in general, an inside diameter equal to the inside diameter of the tubing or conduit, such as 23. The inner surface 24 of the nipple 11 terminates at the flanged end in an annular recess 25 whose diameter is sufficiently large to receive therein in seated engagement the end of the tubing or conduit 23.

The spacing washer 14 is formed of any tubular material having an outside diameter approximately equal to that of the spring washer 13 for free insertion into the enlarged end 19 of the tubular member 12. It is preferred that the outer surface of washer 14 be smooth and of unitary diameter, and, if desired, flat faces similar to faces 17 on the flange of nipple 11 can be provided to register therewith when the fitting is assembled. The diameter of the inside surface 26 of the washer 14 is equal to that of the annular recess 25 in order that the tubing or conduit 23 may be freely inserted therethrough without any appreciable play. A conical bore 27 is provided at one end of the washer 14 and terminates in the inner surface 26 in spaced relation inwardly of the opposite face of the washer. The angularity of the bore 27 is substantially the same as the angularity of the locking portion 21 of the spring washer 13.

The assembled fitting 10 is best illustrated in Figure 2 while the relationship of parts prior to assembly is best illustrated in Figure 3. In assembling the fitting 10, the lock washer 13 is seated against one side of the spacing washer 14 with its flat portion 20 and its angular locking portion 21 engaging the flat face 28 and the conical bore 27 respectively of the spacing washer 14. The other flat face 29 of the spacing washer 14 and the adjacent flat face 30 of the nipple 11 are brought into engagement and three parts are then pressed into the enlarged tubular end 19 of the member 12 until the flat portion 20 of the lock washer abuts against the shoulder 31. In this operation, the corners 32, at the ends of the flat faces 17, cut into the wall of the enlarged portion 19 whereby some of the metal is displaced and flows into the recess between each flat face and the inner periphery of the enlarged portion 19, as shown at 33 in Figure 5.

The extended edge 34 of the enlarged tubular portion 19 is then spun or peened against the inner face or shoulder 35 of the flange 16 by a die operation.

As shown in Figures 1 and 2, this die operation forms a peripherally extending slanting or tapering surface 36 adjacent the edges of the flat faces 17 on the nipple. If desired, the nipple flange 16 may be welded within the enlarged portion 19.

As the aperture 22 in the lock washer 13 is smaller in diameter than the outside diameter of the conduit 23, its angular locking portion 21 will be forced inwardly against the conical bore 27 of the spacing washer when a conduit 23 is pressed into the assembled fitting, as will be more fully explained hereinafter.

As shown in Figures 1 to 4, the tubular portion 18 of the member 12 is provided with a plurality of axially extending indented portions 37. This provision has been made necessary by reason of the tolerances of up to .010 inch in the outside diameter of the tubings or conduit 23 permitted in their manufacture. These indented portions take up differences in the outside diameters of the conduits and more positively seat the tubular portion 18 of the member 12 on the conduit than would otherwise be possible if the inner surface of the portion 18 were smooth. In actual tests, it has been found that these indented portions form such a positive contact with an inserted conduit that an electrical current passed through the entire assembly from one end to the other finds a ready and continuous path without overheating any part thereof. This is of great importance, for prior to the provision of the indented portions it was found that the spring steel washer would overheat, thereby drawing its temper.

By pressing the conduit 23 through the tubular portion 18, through the aperture 22 provided in the lock washer 13 and the spacing washer 14, and into abutment with the recess 25 provided adjacent the flanged end of the nipple 11, the conduit is locked within the fitting 10. As the conduit is forced through the lock washer 13, the aperture 22 is slightly enlarged and the angular locking portion 21 is stretched and pushed into substantial seated engagement with the conical bore 27 of the spacing washer 14. The inherent resiliency of the locking portion 21 of the lock washer exerts pressure angularly against the outer surface of the conduit and resists withdrawal of the conduit from the tubing. If a pulling force is exerted tending to pull the conduit out of the assembly 10, then the locking portion 21 of the lock washer 13 grips the outer surface of the conduit and tends to straighten into the plane of the locked flat portion 20. Clearly, the greater the pulling force applied to the conduit 23 the greater will be the pressure exerted by the lock washer to resist separation of the conduit. If sufficient pull is exerted on the conduit, a thin layer of metal around the entire periphery of the conduit will be scraped off.

It has been found by tests that the force necessary to press the conduit 23 within the assembly 10 is approximately one-third that of the pulling force necessary to pull the conduit out of the assembly.

It is to be noted that the inner surface 38 of the conduit or tubing 23 lies in flush relation with the inner surface 24 of the nipple 11 thereby providing a uniform inside diameter throughout the assembly. Furthermore, the tight engagement between the elements making up the assembly illustrated in Figure 2 provides a water tight joint.

While it is preferred that conduits or tubing such as 23 be so cut as to provide a square outer edge 39, it is realized that tools are not always available on the job for so doing. If the conduit is cut by machine, an end at right angles to the outer edge thereof is assured. But if cut on the job where only perhaps a hacksaw is available, then an end cut on an angle as illustrated by the dotted line 39a of Figure 2 is usually the result.

It is, therefore, necessary to space the locking washer 13 inwardly of the conduit end 39 so that a full grip therebetween is assured even though the end be cut at an angle. This is provided for by the spacing washer 14 whose thickness is dependent only upon the distance at which the edge of the locking washer 13, defined by the central opening 22, is desired spaced from the recess 25 into which is seated the end of an inserted conduit. Obviously, this spacing may be varied by varying the thickness of the spacing washer 14 and the limit of such variation is only dependent upon the length provided on the enlarged tubular end 19 of the member 12.

In the event conduits or tubing are used having machined ends which are square with the inner and outer surfaces thereof, or are slightly angularly disposed thereto, then the need for the spacing washers 14 is eliminated and the connector or coupling fittings illustrated may be assembled without the spacing washers. They are only necessary where tubings are used which have, or might have, ends which are cut at an angle from a true right-angular position relative to their inner and outer surfaces.

In Figure 6 there is illustrated a modified form of fitting assembly embodying the same principles as set forth above, and serving as a double coupling or fitting for the purpose of connecting together the ends of thin walled tubing or conduits. In this modification, the conduits 23, the tubular members 12, the lock washers 13, and the spacing washers 14 are formed and coact in the same manner as previously described. In place of the nipple 11 there is substituted a flanged connector member 40, each end portion of which is constructed in a manner similar to the flanged end of the nipple 11.

At each end of the connector 40 there is provided an outwardly extending peripheral flange 16a having flat surfaces 17a therearound.

The inner periphery of the member 40 is formed by the cylindrical surface 41 whose diameter is equal to the inside diameter of the tubing 23. When the tubings 23 abut against the recesses 25a of the member 40, their inside surfaces 38 and 41 are in flush relation.

Each of the flanges 16a are provided with an inner shoulder 35a against which the extended edge 34 of the member 12 is spun or peened to form a tapering surface 36 as previously described.

The fitting assembly (Figure 6) thus comprises a connector member 40, a resilient lock washer 13 and a spacing washer 14 at each end thereof, and a flanged tubular member 12 in connected engagement with each flange of the connector 40 as shown. The tubular members 12 are provided with indented portions 37 in the same manner and for the same purpose as previously described.

When each of these tubings 23 is pressed into the assembly as illustrated, the respective lock washers 13 grip and hold the tubings in the same manner as described with the assembly illustrated in Figure 2.

It is to be noted in Figures 2 and 3 that the corner 42 is relatively square or of right-angular construction. If desired, this corner may be rounded as shown at 43 of Figure 6 to provide more clearance for the free movement of the flexible locking portion 21 in an axial direction.

From the foregoing description it will be noted that a coupling fitting has been provided of the resilient lock washer type, capable of being secured on the end of a tubing or for connecting together the ends of thin walled tubings whose end or ends may either be square or slightly disposed from a right-angular position relative to an outer edge thereof, while maintaining a smooth, unbroken inner surface therethrough. The tubular member 12, the lock washers 13, and the spacing washers 14 are common to both coupling and connector types of fittings. In the latter fitting, a threaded nipple 11 is used with the member 12 and the washers 13 and 14. In the former type of fitting a double-flanged connector 40, whose ends are shaped in the same manner as the flanged end of the nipple 11, connects a pair of members 12 and a pair each of washers 13 and 14. It is to be further noted that fittings of the types illustrated in Figures 1 and 6 may be assembled by the manufacturer and pressed on the end of a tubing cut to the desired length on the job, even though the ends of the tubing are not square with its longitudinal edges.

While particular embodiments of this invention have been illustrated, it will, of course, be understood that the invention should not be limited thereto, since many modifications may be made, and, therefore, it is contemplated by the appended claims to cover all such modifications as fall within the true spirit and scope of the present invention.

I claim as my invention:

1. A fitting comprising tubular members, one of said members having a flange thereon, the other of said members having an enlarged portion receiving said flange and terminating in a shoulder, and a lock washer having a portion between said flange and said shoulder and a frusto-conical portion having an aperture with an unbroken edge and of slightly less diameter than a member inserted therein for gripping an inserted member, the enlarged portion being bent around said flange and lock washer to secure said members together, said frusto-conical portion permitting said inserted member to slide relative thereto in one direction and expanding into biting engagement to resist movement in the opposite direction.

2. A fitting for receiving a tube end, comprising cooperating parts provided with spaced opposed inner faces and inter-engaging portions holding said parts against separation, and a spring lock washer having an outer annular portion clamped between said faces and an integral offset convergent portion having a substantially continuous edge defining an opening which before application is of slightly less diameter than the outer diameter of said tube end, the inherent spring of said washer permitting said tube end to be forcibly inserted therein but causing the edge of said offset convergent portion to bite into said tube end to resist withdrawal thereof.

3. A fitting comprising cooperating parts having unthreaded inter-engaging flanged portions holding said parts in assembled relation and presenting spaced opposed faces when assembled, and a spring metal lock washer having an outer annular portion clamped between said opposed faces and an inner frusto-conical portion the free edge of which in normal condition before application defines an opening of less diameter than that of a tube end to be inserted therein for substantially complete peripheral engagement with said tube whereby said edge will bite into said tube upon the operation of a force tending to withdraw said tube end to resist such withdrawal.

THEODORE W. BRIEGEL.